A. MILLER.
GARDEN TOOL.
APPLICATION FILED MAY 4, 1921.

1,423,865.

Patented July 25, 1922.

Inventor:
Arthur Miller
by attorneys

UNITED STATES PATENT OFFICE.

ARTHUR MILLER, OF COLUMBUS, OHIO.

GARDEN TOOL.

1,423,865.  Specification of Letters Patent.  Patented July 25, 1922.

Original application filed June 13, 1919, Serial No. 303,963. Divided and this application filed May 4, 1921. Serial No. 466,819.

*To all whom it may concern:*

Be it known that I, ARTHUR MILLER, a citizen of the United States, and resident of Columbus, in the county of Franklin and State of Ohio, have invented a new and useful Improvement in Garden Tools, of which the following is a specification.

This invention relates to improvements in garden tools and has for its object to provide a device adapted to be removably secured to the blade of a hoe or similar tool for making a furrow or drill.

Another object is to provide a tool having means thereon by which it may be reversed and secured to the blade of a hoe for closing or filling the furrow.

A still further object is to provide certain improvements in the form, construction and arrangement of the parts, whereby the above named and other objects may be effectively attained.

A practical embodiment of my invention is represented in the accompanying drawings, in which—

The device comprises a blade denoted by 1, of triangular shape, and downwardly extending wings 2 depending from the blade. The wings 2 are substantially of triangular form, one edge of each wing being formed by being bent on the triangular blade 1, so that one point of each wing and the triangular blade will converge, as shown at 3 in the several figures. The free corner of each wing is rounded and denoted by 4.

Figure 6:
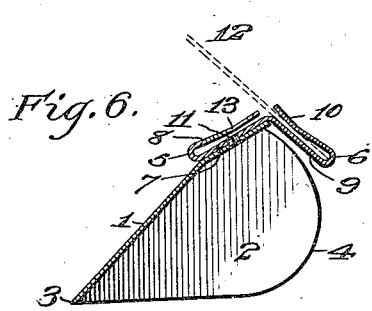
Fig. 6 represents a vertical central section taken in the plane of the line VI—VI of Fig. 5.
Figure 7:
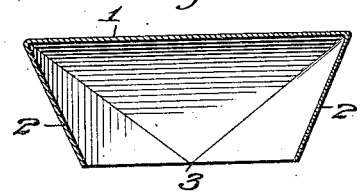
Fig. 7 represents a vertical section taken in the plane of the line VII—VII of Fig. 4, looking in the direction of the arrows.

The rear end of the blade is provided with yielding clips 5, 6, formed of a single piece of metal, and arranged approximately at right angles to each other. The clip 5 is formed of a rigid member 7 and a yielding member 8. The clip 6 is formed with a rigid member 9 and a yielding member 10. The clips are secured to the blade 1 by any well-known and approved means, in the present instance I have shown rivets 11 which engage the rigid member 7 and the blade 1, as shown in Fig. 6.

For the purpose of conveniently securing the member 7 to the blade 1, the yielding member 8 has a series of holes 13, through which a riveting tool (not shown) may be inserted to engage the rivet while being clinched. When the clips are secured in position on the blade 1, the clip 6 will overhang the blade 1 and extend a slight distance downwardly between the wide ends of the wings 2. The position of the clips is such that the tool may be secured to a blade 12 of the hoe, shown in dotted outline in Figs. 2, 3 and 4, and assume approximately the same angle as the blade, so that it may be operated similar to that of the hoe and perform its particular function.

Figure 1:
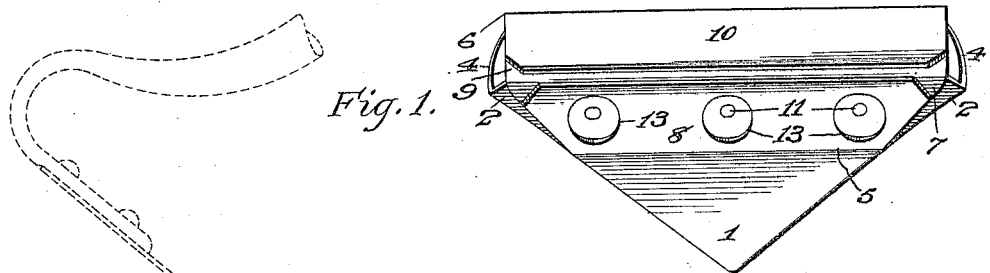
Fig. 1 represents a plan view of my device.
Figure 2:
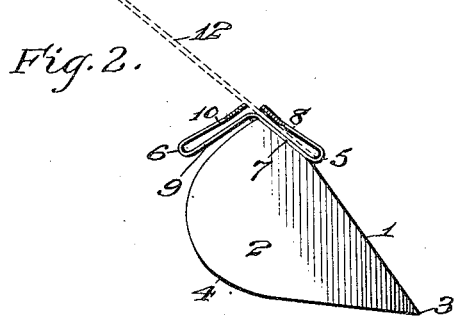
Fig. 2 represents a side elevation of the same showing the position it assumes when applied to the blade of a hoe for making a furrow, the hoe being shown in dotted outline.
Figure 3:
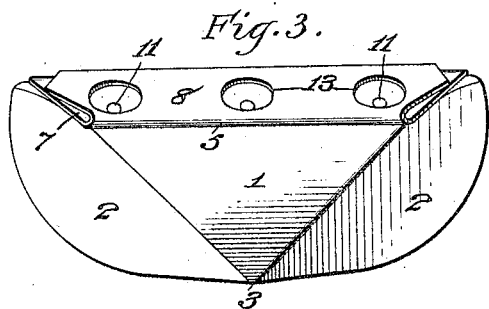
Fig. 3 represents a front elevation of the same.
Figure 4:
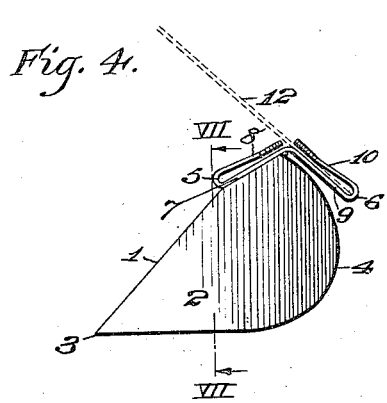
Fig. 4 represents a side elevation of the device applied to the blade of a hoe for closing or filling the furrow, the blade of the hoe being shown in dotted outline.
Figure 5:
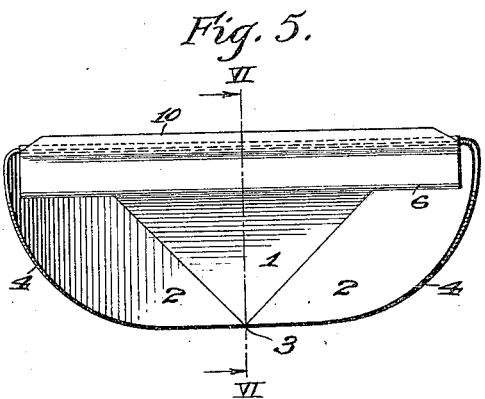
Fig. 5 represents a front elevation of the same.

In operating the tool to form the furrow or drill, the tool is secured in position on the hoe by forcing the clip 5 onto the blade 12, as shown in Fig. 2, and by placing the point 3 of the tool into the ground and drawing it toward the operator, a furrow will be formed. To close or fill the furrow, the clip 6 is forced onto the blade of the hoe, as shown in Fig. 4, in which position the wings 2 of the tool, when drawn toward the operator, will turn the earth toward the center of the furrow and rearwardly toward the point where it will be delivered into the furrow.

The subject matter of this application is shown and described, but not claimed in my co-pending application, Serial No. 303,963, filed June 13th, 1919.

It will be understood that various changes may be resorted to in the form, construction and arrangement of the several parts without departing from the spirit and scope of my invention; and hence, I do not intend to be limited to the specific details herein set forth except as they may be included in the claims.

What I claim is:

1. A garden tool having a yielding means arranged to engage the blade of a hoe.

2. A garden tool having means secured thereto and arranged to engage the blade of a hoe for holding the tool in different positions with respect to the blade.

3. A garden tool having a clip secured thereto arranged to engage the blade of a hoe.

4. A garden tool having a clip arranged to engage the blade of a hoe, said clip comprising a rigid member and a yielding member bent to form a resilient bight therebetween.

5. A garden tool having a clip arranged to engage the blade of a hoe, said clip comprising rigid members bent to form approximately an angle of 90°, each of said members having a yielding member bent to form a resilient bight between it and its respective rigid member.

In testimony, that I claim the foregoing as my invention, I have signed my name, this 2nd day of April 1921.

ARTHUR MILLER.